United States Patent [19]

Norrie et al.

[11] Patent Number: 5,408,674

[45] Date of Patent: Apr. 18, 1995

[54] SYSTEM FOR CHECKING THE VALIDITY OF TWO BYTE OPERATION CODE BY MAPPING TWO BYTE OPERATION CODES INTO CONTROL MEMORY IN ORDER TO REDUCE MEMORY SIZE

[75] Inventors: Christopher I. W. Norrie, San Jose; Carolee N. Newcomb, Los Altos; Peter K. Yu, Sunnyvale, all of Calif.

[73] Assignee: Amdahl Corporation, Sunnyvale, Calif.

[21] Appl. No.: 995,772

[22] Filed: Dec. 23, 1992

[51] Int. Cl.6 ........................... G06F 9/32; G06F 9/28
[52] U.S. Cl. .................................... 395/800; 395/425; 395/375; 364/259.4; 364/262.4; 364/262.8; 364/DIG. 1; 364/946.2; 364/946.6; 364/947.5
[58] Field of Search ..................... 395/800, 425, 375

[56] References Cited

U.S. PATENT DOCUMENTS

| | | | |
|---|---|---|---|
| 3,949,370 | 4/1976 | Reyling, Jr. et al. | 395/375 |
| 4,338,663 | 7/1982 | Strecker et al. | 395/375 |
| 4,443,865 | 4/1984 | Schultz et al. | 395/425 |
| 4,449,184 | 5/1984 | Pohlman, III et al. | 395/250 |
| 4,931,989 | 6/1990 | Rhodes, Jr. et al. | 395/375 |
| 5,233,695 | 8/1993 | Miyoshi | 395/375 |
| 5,321,821 | 6/1994 | Itomitsu et al. | 395/375 |

*Primary Examiner*—Alyssa H. Bowler
*Assistant Examiner*—Meng-Ai T. An
*Attorney, Agent, or Firm*—Fliesler, Dubb, Meyer & Lovejoy

[57] ABSTRACT

A mapping system for mapping a plurality of two byte operation code series into a control store where in each two byte operation code the first byte identifies the series in which that two byte operation code is included and the second byte identifies that specific operation code within the identified series, the mapping system comprising a first register for storing the first and second bytes of a two byte operation codes, a first control store for storing control word for the two byte operation codes, a first means for generating, from the first and second bytes stored in the first register, a first control store address for the first control store thereby providing access to the control word for processing the two byte operation code store in the first register and a second means for generating, from the first and second bytes stored in the first register, a first signal when an invalid two byte operation code has been stored in the first register for processing, the first signal invalidating the processing of the two byte operation code stored in the first register including any processing of the control word accessed by the first control store in response to the first control store address generated by the first means.

10 Claims, 4 Drawing Sheets

| ADDRESS | RAM BITS | | | | | | | | |
|---|---|---|---|---|---|---|---|---|---|
| D1 & D2 | 0 | 1 | 2 | 3 | 4 | 5 | 6 | ---- | 14 |
| 0000 0000 | 0 | 0 | 1 | 1 | 1 | 1 | 0 | | 0 |
| 0000 0001 | 0 | 1 | 0 | 1 | 0 | 1 | 0 | | 0 |
| 0000 0010 | 1 | 0 | 1 | 1 | 1 | 1 | 0 | | 0 |
| ≡ | | | | | | | | | |
| 1111 1111 | 1 | 0 | 1 | 1 | 1 | 1 | 0 | | 0 |
| TWO BYTE OP CODE | A6 | B2 | B3 | E4 | E5 | E6 | | | |

FIG. 3

| TWO BYTE OP CODE | MASK BITS | | | | | | | | |
|---|---|---|---|---|---|---|---|---|---|
| | 0 | 1 | 2 | 3 | 4 | 5 | 6 | ---- | 14 |
| A6 | 1 | 0 | 0 | 0 | 0 | 0 | 0 | | 0 |
| B2 | 0 | 1 | 0 | 0 | 0 | 0 | 0 | | 0 |
| B3 | 0 | 0 | 1 | 0 | 0 | 0 | 0 | | 0 |
| E4 | 0 | 0 | 0 | 1 | 0 | 0 | 0 | | 0 |
| E5 | 0 | 0 | 0 | 1 | 0 | 0 | 0 | | 0 |
| E6 | 0 | 0 | 0 | 0 | 0 | 1 | 0 | | 0 |

FIG. 4

SYSTEM FOR CHECKING THE VALIDITY OF TWO BYTE OPERATION CODE BY MAPPING TWO BYTE OPERATION CODES INTO CONTROL MEMORY IN ORDER TO REDUCE MEMORY SIZE

BACKGROUND OF THE INVENTION

1. Field of the Invention

This invention relates to computer systems employing two byte operation codes and the manner in which the two byte operation codes are mapped into control memory for use by the computing system.

2. Description of the Related Art

In the past operation codes were encoded by one byte of data, eight bits, providing a maximum of 256 operation codes for use in the computing system. In the recent past system architecture has been modified to encode some of the operation codes by two bytes of data, 16 bits, in addition to the operation codes encoded by one byte of data.

In a two byte operation code the first byte is used to define a series of operation codes and the second byte is used to define the operation code within the series. Therefore, it is possible that if all operation codes were stored as two bytes of data, the number of operation codes available to the system would be, 256×256, 65,536 operation codes. However, the present system architecture not need that capacity of operation codes and, therefore, at present, not all operation codes are two bytes in length. For each two byte operation code there is a possible 256 operation codes in that series. In a system using two byte operation codes it is necessary to identify those operation codes within a series of operation codes that are not being used.

A straightforward approach to this problem would be to have a control memory of sufficient size to have a unique address for each two byte operation code where the data stored in that address will identify whether or not the operation code is a valid operation code or an invalid operation code. However, this would require 256 memory addresses to be used for each two byte operation code series employed in the system design.

Another approach to addressing a control store for a two byte operation code is to have the first byte of the operation code address a control memory location which has stored therein a pointer to a microcode routine which would then decode the second byte of operation code to determine the function to be processed and whether the decoded operation code is valid or not. This is an acceptable procedure where the number of operation codes within a series of operation codes are low such that the two byte operation code may be effectively treated as a one byte operation code without losing system efficiency. However, as the number of two byte operation codes within a series of operation codes increases, the system efficiency deteriorates because of the time necessity for the microcode to decode and operate upon the two byte operation codes.

SUMMARY OF THE INVENTION

It is an object of the present invention to provide a system for mapping two byte operation codes into control memory such that the amount of memory space used to store the two byte operation codes is minimized.

It is another object of the invention to provide a system for mapping two byte operation codes into control memory whereby the system quickly identifies the operation codes with each two byte operation code that is not valid while employing a minimum amount of memory space.

Briefly, the invention is addressed to mapping six two byte operation code series into control memory while minimizing the amount of memory necessary for storing the operation codes. The invention is carried out in a pipeline architecture computer system where instructions are processed by a plurality of overlapping flows where the flows overlap. Each flow is divided into six cycles, a decode operation code cycle D, an address presentation cycle A, a translation cycle T, a buffer access cycle B, an execution cycle X, and a write or store cycle W. The flows are overlapped such that the D cycle of one flow is processed at the same time as the preceding A cycle of the previous flow is being processed. Therefore, it is possible to be processing six flows at the same time where each flow is having a different cycle within the flow being processed. The system architecture is such that the six cycles of the flows are maintained in a constant relationship with each other. If it is necessary to extend the execution cycle of a flow, then the processing of the other five cycles in the other processing flows will not be allowed to complete until the execution cycle of the flow executing the execution cycle has completed.

Four memory units are provided where one memory unit is used to store data defining whether or not each of the possible 256 operation codes within each series of two byte operation codes is valid or not. An A cycle control store is provided which includes an address location associated with each two byte operation code for storing indicia to identify the two byte operation code to be processed and for determining whether or not the second byte of the two byte operation code defines a valid or an invalid operation code. The pipeline computer system architecture also provides D cycle control store A and D cycle control store B. Each of the D cycle control stores can receive addresses from a multitude of sources and, therefore, a selector means is provided to control from which source the address is to be obtained for each the D cycle control stores during each flow. D cycle control store B decodes the first byte of the two or one byte operation codes stored in an operation data register such that during the next flow the D cycle address for D cycle control store A will be derived from both bytes of the two byte operation code. The system is designed to map six two byte operation code series into six dedicated areas within the D cycle control store A. Operation codes are often provided in numerical sequence and a hashing means is provided to alter the order of the operation codes in a two byte operation code series from a sequential to a non-sequential order in the designated area of D cycle control store A for each of the two byte operation code series. The reason why the addresses are hashed is to reduced the probability of two operation codes generating the same address where the space allocated to that two byte operation code is less than 256 memory locations.

A selector means is provided for selecting the output of the D cycle control store A or the D cycle control store B under control of the system for any flow. An address for D cycle control store A is generated by a hasher means for each flow, whether or not the operation code is a one byte or two byte operation code. Where the control word read from D cycle control store B indicates a two byte operation code, the address generated by the hasher means will be used as the address for the control word from D cycle control store A to be provided and used in the D cycle of the third flow. The validity of a two byte operation code is detected during the first flow such that when an invalid two byte operation code is detected, the system will allow all previous flows for the preceding instructions to be completed and will invalidate the present two byte operation code operation. Therefore, for any valid two byte operation code at least three flows are necessary for executing the operation code since the two byte operation code control word can first be made available to the system during the third flow of an instruction. This system permits one byte operation codes to be processed in the manner as the one byte operation codes were previously processed.

An advantage of the mapping system of two byte operation codes into control memory is the reduced amount of memory necessary for storing the two byte operation code.

Another advantage of the mapping system mapping two byte operation codes into memory is the minimum amount of processing time needed to determine whether or not an operation code is a one byte or valid two byte operation code.

BRIEF DESCRIPTION OF THE DRAWINGS

The invention will be described with respect to the particular embodiments thereof and references will be made to the drawings, in which:

FIG. 3 is a table illustrating the data pattern stored in the RAM for indicating whether or not each of the operation codes within each series of two byte operation codes are valid;

FIG. 4 is a table showing the mask stored in the A cycle control store for identifying which two byte operation code is being decoded;

DESCRIPTION OF THE PREFERRED EMBODIMENTS

Figure 1:
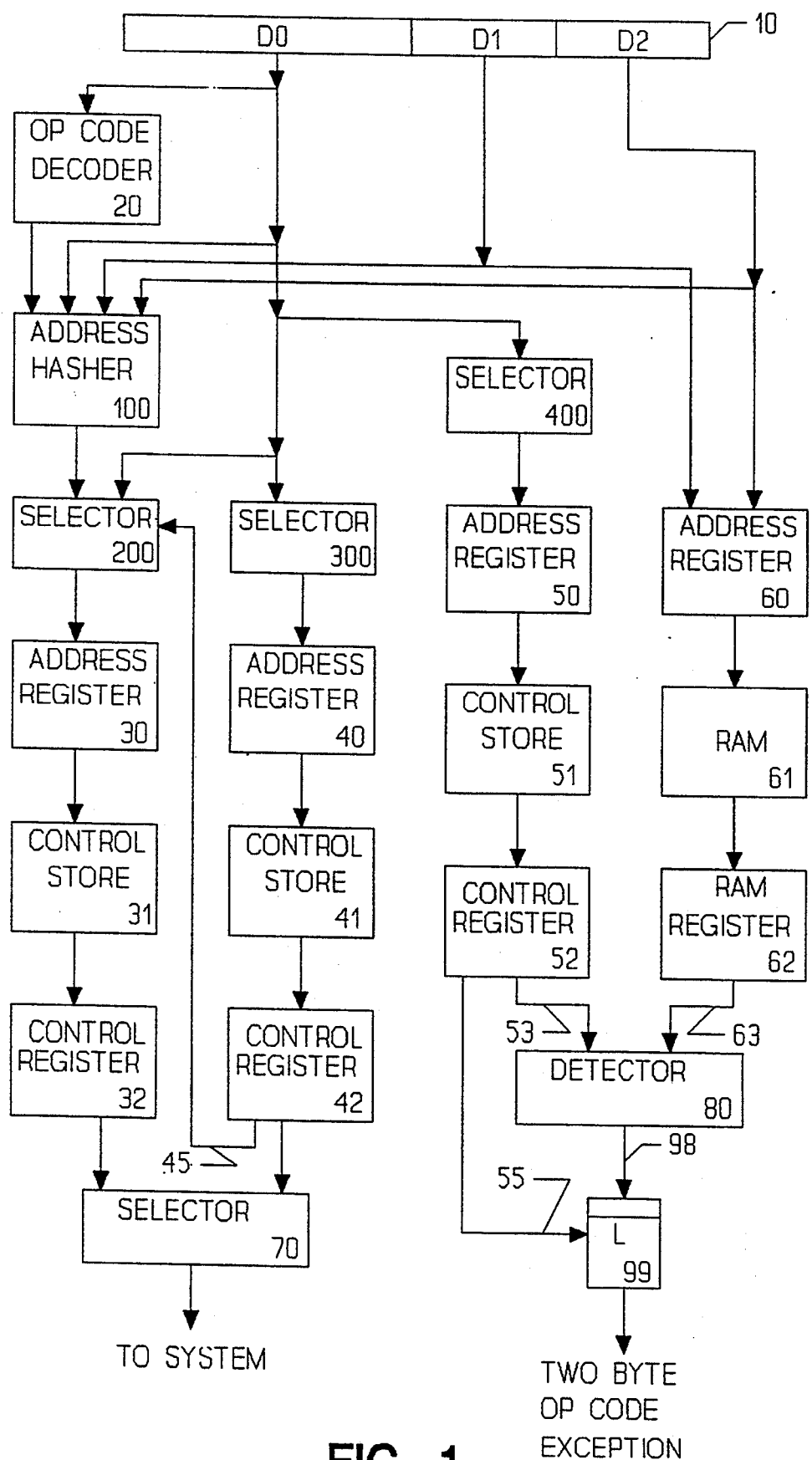
FIG. 1 is a logic diagram showing the mapping system for mapping two byte operation codes into the control store of a pipeline type computing system.

Referring to FIG. 1, an instruction data register 10 is provided which contains at least three fields, D0, D1 and D2. Field D0 is an eight bit field which stores a one byte operation code or the first byte of a two byte operation code of the instruction being processed. The byte instruction code is used to generate the initial address for the control stores which store a control word flow for that instruction and is made available to selectors 200, 300 and 400 for transfer to address registers 30, 40 and 50, respectively. Fields D1 and D2 are four bit fields and are combined to provide an eight bit field for the second byte of a two byte operation code. For a two byte operation code the output of D0 field of register 10 is made available to the operation code decoder 20 to address hasher 100 and to selectors 300 and 400. The output of fields D1 and D2 are made available to the address hasher 100 and address register 60.

The D cycle control stores A 31 and B 41 store the control words for the D cycle of each flow, except the first flow, for a given instruction. The A cycle control store 51 contains the control word for all of the remaining cycles in each flow for a given instruction. Data read out of control store 31, 41, 51 and RAM 61 are written into control registers 32, 42, 52 and RAM register 62, respectively. Selector 70 allows the system to select between the control word presently stored in control register 32 or from control register 42. Detector 80 receives inputs from control register 52 and RAM register 62 and provides an output signal on line 98 indicating either a valid two byte operation code or an invalid two byte operation code is being processed. An assigned field within control register 52 contains a bit for a two byte operation code which gives rise to a signal on line 55 to latch 99 for writing into latch 99 the signal generated on line 98 by detector 80. Latch 99 is set whenever an invalid two byte operation code has been detected which generates a operation exception signal.

Hasher 100 receives the output of fields D0, D1 and D2 as well as the output of operation decoder 20 to generate a 10 bit address for D cycle control store A 31. A field of control register 42 stores a bit that indicates a two byte operation code is being processed and generates a signal to selector 200 for reading the address generated by address hasher 100 into address register 30.

In operation, during the first flow associated with an instruction the operation code in field D0 is written into address register 50 through selector 400, which in turn reads out the contents of that address in control store 51 into control register 52. The timing of the computing system is such that the output of A control register 52 is available for processing prior to the start of the A cycle of the first flow. During the second flow of the instruction the contents of field D0 are read into address register 40 which in turn reads out the contents at that address in D cycle control store B 41 into control register 42. If the operation code read out of control store 41 is the first byte of a two byte operation code, then a designated one bit field with control register 41 will generate a signal on line 45 to selector 200 for transferring the address generated by address hasher 100 into address register 30. The control word stored in D cycle control store A 31 at the hashed address will be read out of control store 31 into control register 32 and made available to the system during the D cycle of the third flow of the instruction. If a valid two byte operation code is being processed by the system, selector 70 will select the output of control register 32 rather than the output of control register 42 during the third flow of the instruction.

The contents of field D0 are stored, as the address of an operation code, in address register 50 during the D cycle of the first flow, causing the data word stored at that address in A cycle control store 51 to be written into control register 52. For a two byte operation code, control register 52 contains a first field of 15 bits to act as a mask for identifying the two byte operation code being processed and a second byte field for generating a signal on line 55 to write into latch 99 the output of detector 80.

At the same time the contents of fields D1 and D2 of register 10 are used as the address for RAM 61 for reading out the word stored at that address. RAM 61 contains 256 location, where each location is 16 bits wide and has an address associated with one of the possible 256 operation codes for each two byte operation code series. The data format of RAM61 will be discussed hereinafter. The word read out of RAM 61 is stored in RAM register 62. Detector 80 uses the mask field stored in control register 52 for a two byte operation code to select a single bit from the 15 bits being received from the RAM register 62 so as to isolate the bit that indicates the validity of the two byte operation code. If the operation code stored in field D1 and D2 is a valid operation code, then a zero is stored at the isolated location and if the operation code stored in fields D1 and D2 is invalid, then a one is stored at the isolated location. Control register 52 provides a signal to read into latch 99 the results of the detection process if the instruction uses a two byte operation code. Therefore, latch 99 will only be set during the processing of a two byte operation code instruction regardless of the output of detector 80. Latch 99 will be set to a one whenever a two byte operation code exception, i.e. an invalid two byte operation code, has been detected by detector 80. Once a two byte operation code exception is detected the system will allow all previous instructions in the pipeline to be completed and then will enter into an exception routine. Since the system continues to operate to complete the flows for the preceding instructions already progress, the of a two byte address from D cycle control store A 31 will be completed and stored in control register 32. However, since a two byte operation code exception has already been generated and detected, the system will invalidate the entire processing of the invalid two byte operation code instruction.

Figure 2:
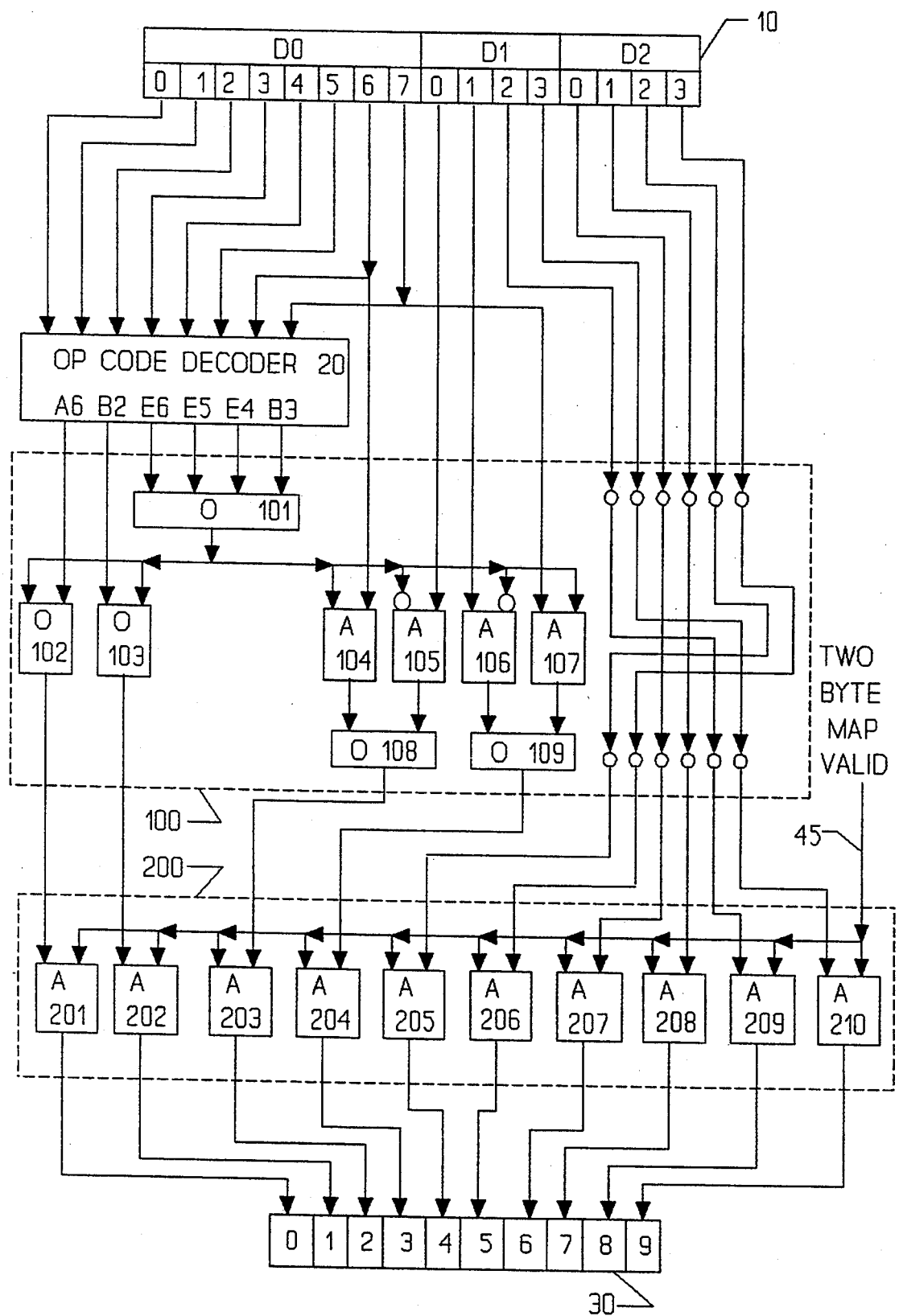
FIG. 2 is a logic diagram of the address hasher means used in the mapping system.

Referring to FIG. 2, the logic of address hasher 100 for generating a hash address is shown. The six operation codes that are processed as two byte operation code series are B2, A6, E4, E5, E6 and B3. Two byte operation code series B2 and A6 are widely used and, therefore, 256 addresses are made available for each of these two byte operation code series in D cycle control store A 31. Operation codes B3, E4, E5 and E6 each use up to 64 operation codes and therefore, 64 addresses are made available for use with each of these four series of operation codes, B3, E4, E5 and E6. D cycle control store A 31 contains 1,024 addresses. Operation code decoder 20 receives the 8 bits from field D0 of register 10 and provides an output to OR 102 when operation code A6 is detected, an output to OR 103 when operation code B2 is detected, and an output to OR 101 when either operation codes E4, E5, E6 or B3 are detected. Bits 6 and 7 of field D0 will have a value of 00 when operation code E4 is stored in field D0, a value of 01 when operation code E5 is stored in field D0, a value of 10 when operation code E6 is stored in field D0, and a value of 11 when operation code B3 is stored in field D0. It can be realized that bits 6 and 7 of field D0 therefore uniquely identify two byte operation codes E4, E5, E6 and B3 from each other and, therefore, are used in the generation of the 10 bit address for D cycle control store A 31. Bit 0 of field D1 of register 10 is connected to AND 105 and bit 1 of field D1 of register 10 is connected to AND 106. Bits 2 and 3 of field D1 and bits 0, 1, 2 and 3 of field D2 of register 10 are connected to address hasher 100. OR 101 is connected as an input to OR 102,103,104 and 107, and to the negative input of AND 105 and 106. OR 108 will provide either the output of AND 104 or 105 to AND 203. OR 109 will provide either the output of AND 106 or 107 to AND 204.

Bit 2 of field D1 of register 10 is connected by address hasher 100 to AND 209. Bit 3 of field D1 of register 10 is connected by means of address hasher 100 to AND 210. In similar manner, bits 0, 1, 2 and 3 of field D2 of register 10 are connected by means of address hasher 100 to ANDs 207, 208, 205 and 206, respectively. When operation code decoder 20 does not decode operation codes E4, E5, E6 or B3, AND ].05 and 106 will connect bits 0 and 1 of field D1 of register 10 through ORs 108 and 109 to ANDs 203 and 204, respectively. Therefore, the bits in fields D1 and D2 have been rearranged to form a different address to be used by D cycle control store A 31 than the address indicated by the arrangement of the in field D0, D1 and D2. AND 201 will be conditioned by OR 102 when either operation code decoder 20 decodes operation code series A6, B3, E4, E5 or E6. AND 202 will be conditioned by the output of OR 103 whenever operation code decoder 20 decodes operation codes B2, B3, E4, E5 or E6. AND circuits 201 through 210 in selector 200 allow the output of address hasher 100 to be read into address register 30 whenever a two byte map signal is generated on line 45. AND circuits 201 and 202 will have a value of 00 whenever operation code decoder 20 does not decode operation codes A6, B2, B3, E4, E5 or E6, a value of 01 whenever operation code A6 has been decoded, a value of 10 whenever operation code B2 has been decoded, and a value of 11 whenever operation codes B3,. E4, E5 or E6 has been decoded. Whenever AND circuits 201 and 202 have a value of 11, AND 203 and 204 will have a value of 00 when operation code E4 has been detected, a value of 01 when operation code E5 has been detected, a value of 10 when operation code E6 has been detected, and a value of 11 when operation code B3 has been detected. A ten bit hashed address has therefore been generated in accordance with the hashing algorithm embodied within address hasher 100.

Figure 6:
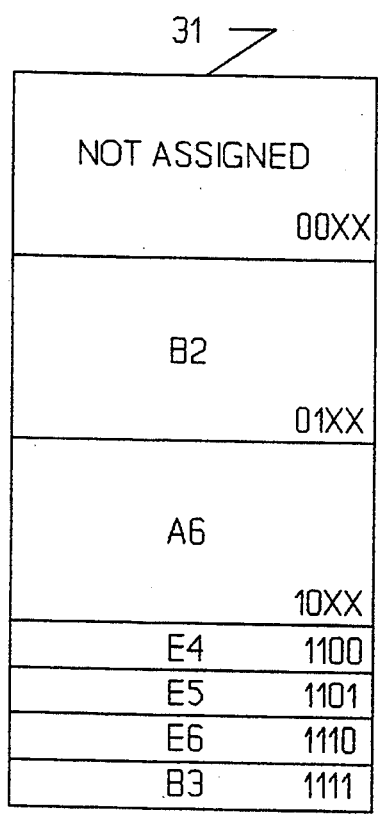
FIG. 6 is a diagram illustrating the allocation of memory space within D cycle control store A for the six two byte operation code series being used by the computing system.

Referring to FIG. 6, the address assignment for the two byte operation codes is therein demonstrated for D cycle control store A 31. The four high order bits of the address shown in the diagram are the bits 0, 1, 2 and 3 of address register 30. The four bits will have a value of 00XX when a two byte operation code has not been detected and, therefore, those 256 addresses are available for use by the system. The four bits will have a value of 01XX whenever the operation code B2 has been decoded by operation code decoder 20 and the 256 address locations will be uniquely addressed as a function of the contents of fields D1 and D2 as rearranged by address hasher 100. The four bits will have a value of 10XX whenever operation code A6 is detected by operation code decoder 20. The 256 addresses for the operation codes associated with two byte operation code series A6 will be defined by the eight bits contained in fields D1 and D2 of register 10 as hashed by address hasher 100. The four bits will have a value of 1100 when operation code E4 has been decoded, a value of 1101 when operation code E5 has been decoded, a value of 1110 when operation code E6 has been decoded, and a value of 1111 when operation code B3 has been detected. The 64 addresses assigned to each of these operation codes will be determined from bits 2 and 3 of field D1 and bits 0, 1, 2 and 3 of field D2 of register 10 as hashed by address hasher 100.

Referring to FIG. 3, a table is shown to illustrate the contents of RAM storage 61 which is used to determine if the address defined by the second byte of a two byte operation code is a valid operation code. RAM 61 has 256 addresses where each address location contains 16 bits. Of the 16 bits, 15 bits represent 15 possible two byte operation codes and one bit is a parity bit. For each of the 256 addresses, each bit is assigned to one of the possible 256 operation codes represented by a two byte operation code. Two byte operation code series A6 has been assigned bit position 0, two byte operation code series B2 has been assigned bit position 1, two byte operation code series B3 has been assigned bit position 2, two byte operation code series E4 has been assigned bit position 3, two byte operation code series E5 has been assigned bit position 4, and two byte operation code series E6 has been assigned bit position 5. Bit position 0 in each of the 256 memory address locations provides a bit position for each of the operation codes that are possibly decoded with reference to the two byte operation code A6. Where the operation code store in fields D1 and D2 is an invalid operation code, a one is placed in the bit position in the RAM 61 assigned to two byte operation code stored in fields D0, D1 and D2. As can be seen from FIG. 3, for the two byte operation code series A6, operation codes 2 and 255 are invalid and operation codes 0 and 1 are valid. Operation code 256 for two byte operation codes B3, E4, E5 and E6 are all marked invalid since by design only 64 operation codes can be included within these two byte operation code series. Bit positions 6 through 14 are not used and are provided for expansion purposes.

Referring to FIG. 4, the 15 bit mask field of the control word for each of the six two byte operation codes stored in A cycle control store 51 is shown. The mask fields contain all zeros stored in all bit locations except for a 1 stored in bit 0 of the mask field for two byte operation code series A6, a 1 stored in bit 1 of the mask field associated with two byte operation code series B2, a 1 stored in bit 2 of the mask field associated with two byte operation code series B3, a 1 stored in bit 3 of the mask field associated with two byte operation code series E4 in bit 3, a 1 stored in bit 4 of the mask field associated with two byte operation code series E5, and a 1 stored in bit 5 of the mask field associated with two byte operation code series E6. Bit positions 6 through 15 are reserved for further expansion of the system where more than six two byte operation code series are to be processed in accordance with this mapping system.

Figure 5:
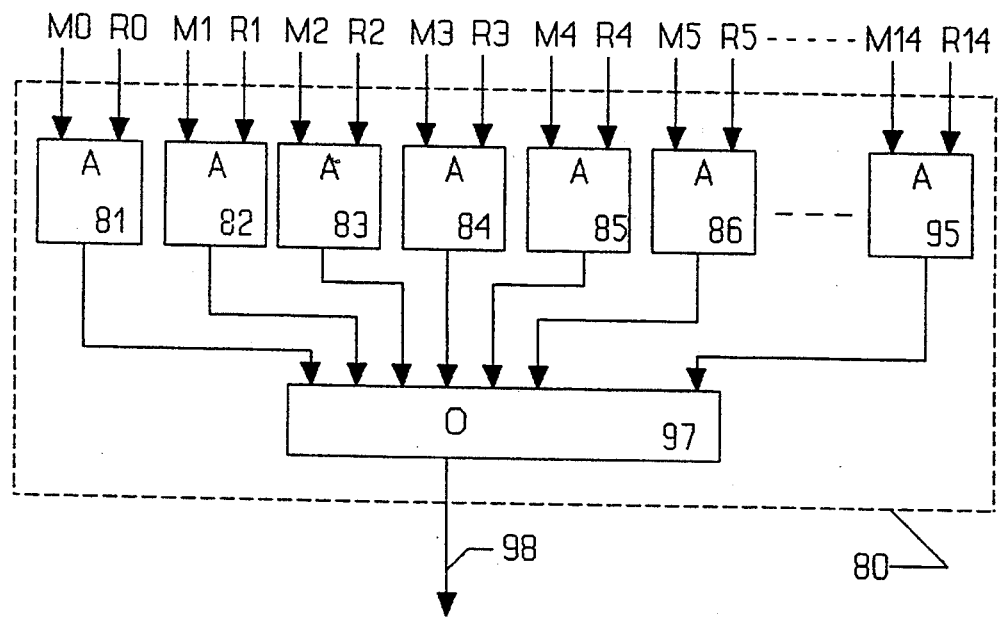
FIG. 5 is a logic diagram of the detector used for determining whether a valid two byte operation code is being decoded by the system.

Referring to FIG. 5, the logic for decoder 80 of FIG. 1 is shown. Decoder 80 is comprised of 15 ANDs 81 through 95 where the output of each of the ANDs is connected as an input to OR 97. The output of OR 97 is provided on line 98. Each AND circuit has an input for the same bit position in the mask stored in control register 52 and in the operation code control word read from RAM 61 and stored in RAM register 62. When two byte operation code series A6 is being processed, the 15 bits of the mask field for two byte operation code series A6, as shown in FIG. 4, is stored in control register 52. Each bit of control register 52 associated with a bit position in the mask field is connected as an input to one of the ANDs 81 through 95 resulting in only AND 81, representing bit 0, receiving a one from control register 52. The output of AND 81 will be a one if the value of bit 0 stored in RAM register 62 is a one and will be a zero if the value of bit 0 stored in RAM register 62 is a zero. By observation it can be seen that the mask provided in FIG. 4 will select one of the ANDs 81 through 95 whose output will then be determined by the value of the corresponding bit position in the control word read from RAM 61 for the operation code stored in fields D1 and D2 of register 10. In effect, control register 62 selects a column in RAM 61 and address register 60 selects a row in RAM 61 thereby uniquely addressing one bit stored in RAM 61 whose value is stored in latch 99.

Therefore, the output of detector 80 will provide a signal on line 98 that is indicative of whether the operation code represented by the second byte of a two byte operation code is a valid operation code within the series of operation codes represented by the first byte of the two byte operation code. A signal generated on line 55 will write the output on line 98 of detector 80 into latch 99 only when a two byte operation code is being processed.

The foregoing has illustrated a system for mapping two byte operation codes into a memory unit where the amount of space dedicated to each of the two byte operation codes is determined by the number of operation codes defined by the second byte of the two byte operation code. Further, memory space has been saved by the use of the RAM 61 which contains data defining the validity of every possible two byte operation code used by the mapping system, therefore relieving the necessity of assigning control store addresses to invalid two byte operation codes. The hashing algorithm employed within address hasher 100 is not critical and any hashing algorithm to change the sequence operation codes from sequential to non-sequential may be employed.

It is possible, because of the limited number of memory addresses made available for two byte operation codes E4, E5, E6 and B3, for hasher 100 to generate the same hashed address for two different operation codes associated with a two byte operation code. The designer of the system can resolve these potential conflicts by storing a control word in the D cycle control store A 31 at the conflict address to branch the system to a microprogram which would then resolve the apparent conflict.

While the invention has been particularly shown and described with reference to the preferred embodiment thereof, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. A system for retrieving a control word for each one byte operation code and each two byte operation code used in a computer system from a control store where a two byte operation code has a first byte which identifies a series of two byte operation codes and a second byte which identifies a specific two byte operation code within a series of two byte operation codes, said system comprising:

a fast register for storing said first byte of the one byte operation code and the two byte operation code and said second byte of the two byte operation code;

first control store for storing the, control word for each of said one byte operation code and each of said two byte operation codes, said first control store being partitioned into segments where a segment has stored therein either said one byte operation codes or a series of said two byte operation codes, said segments being of nonuniform length;

first means for generating, from said first byte of the one and the two byte operation codes and second byte of the two byte operation code stored in said first register, a first control store address for said first control store for retrieving said control word for the one byte or the two byte operation code store in said first control store; and second means for generating, from said first byte of the one and the two byte operation codes and second byte of the two byte operation code stored in said first register, a first signal when an invalid two byte operation code is stored in said first register, said first signal invalidating it processing of the two byte operation code stored in said first register including any processing of said control word retrieved from said first control store in response to said first control store address generated by said first means.

2. The system of claim 1 further comprises:

a second control store for receiving the first byte of the one byte operation code and the first byte of the two byte operation code for storing a second control word for each said one byte operation code and each series of two byte operation codes where each said second control word includes a field indicating whether said second control word is for the one byte operation code or for a series of two byte operation codes; and third means for generating a two byte operation code signal when said field within a retrieved second control word indicates that a two byte operation code is being processed.

3. The system of claim 2 wherein said first means further comprises;

hashing means for generating from said first byte of the first and the second operation codes and second byte of the two byte operation code stored in said first register a hashed address for retrieving the control word of the two byte operation code where said control words stored in said segments of said first control store and the for a series of two byte operation codes are stored in a hashed address sequence.

4. The system of claim 3 wherein said First means further comprises:

selecting means for transmitting the hashed address from said hashing means to said first control store in response to said two byte operation code signal being generated by said third means.

5. The system of claim 4 wherein said second means further comprises:

a third control store for storing a third control word at an address represented by the fast byte of the one byte and the two byte operation codes stored in said fast register, each said third control word including a field for each series of two byte operation codes for identifying which series of the two byte operation codes is associated with the address represented by said first byte of the one byte and the two byte operation codes stored in said first register.

6. The system of claim 5 wherein said second means further comprises:

a validity store for storing for storing a fourth control word at an address represented by said second byte of said two byte operation code store in said first register, each said fourth control word including a field for each series of two byte operation codes where each field indicates whether the second byte of a two byte operation code word represents a valid two byte operation code.

7. The system of claim 6 wherein said second means further comprises:

detector means for receiving said third control word and said fourth control word and generating therefrom an invalidity signal when said second byte of the two byte operation code stored in said first register indicates an invalid two byte operation code for said series of two byte operation codes indicated by said first byte of the two byte operation code stored in said first register; and a storing means for storing said invalidity signal in response to the field in said third control word contemporaneously identifying a two byte operation code as being processed by said system.

8. The system of claim 1 wherein said second means further comprises:

a third control store for storing a third control word at an address represented by the first byte of the one and the two byte operation codes stored in said first register, each said third control word including a field for each series of two byte operation codes for identifying which series of the two byte operation codes is associated with the address represented by said first byte of the one byte and the two byte operation codes stored in said first register.

9. The system of claim 8 wherein said second means further comprises:

a validity store for storing a fourth control word at an address represented by said second byte of said two byte operation code store in said first register, each said fourth control word including a field for each series of two byte operation codes where each field indicates whether the second byte of the two byte operation code word represents a valid two byte operation code.

10. The system of claim 9 wherein said second means further comprises:

detector means for receiving said third control word and said fourth control word and generating therefrom an invalidity signal when said second byte of said two byte operation code stored in said first register indicates an invalid two byte operation code for said series of two byte operation codes indicated by said first byte of said two byte operation code stored in said first register; and a storing means for storing said invalidity signal in response to the field in said third control word contemporaneously identifying a two byte operation code as being processed by said system.

* * * * *

UNITED STATES PATENT AND TRADEMARK OFFICE
CERTIFICATE OF CORRECTION

PATENT NO. : 5,408,674
DATED : April 18, 1995
INVENTOR(S) : Christopher I.W. Norrie et al.

It is certified that error appears in the above-indentified patent and that said Letters Patent is hereby corrected as shown below:

```
Column  8, line 60, "fast" should be --first--.
Column  9, line 15, "it" should be --a--.
Column  9, line 44, delete "for a".
Column  9, line 47, "First" should be --first--.
Column  9, line 57, "fast" should be --first--.
Column  9, line 59, "fast" should be --first--.
Column 10, line  5, delete "for storing"--.
```

Signed and Sealed this

Fourteenth Day of October, 1997

*Attest:*

BRUCE LEHMAN

*Attesting Officer*    Commissioner of Patents and Trademarks